Dec. 13, 1938. F. R. SWANSON 2,140,303
CHUCK
Filed July 15, 1935  3 Sheets-Sheet 1

Inventor:
Fred R. Swanson
By [signature]
atty.

Inventor:
Fred R. Swanson

Dec. 13, 1938.  F. R. SWANSON  2,140,303
CHUCK
Filed July 15, 1935  3 Sheets-Sheet 3

Inventor:
Fred R. Swanson

Patented Dec. 13, 1938

2,140,303

UNITED STATES PATENT OFFICE 2,140,303

CHUCK

Fred R. Swanson, Rockford, Ill., assignor to Sundstrand Machine Tool Co., Rockford, Ill., a corporation of Illinois Application July 15, 1935, Serial No. 31,315

14 Claims. (Cl. 279—110)

This invention relates to chucks and has as one object to provide a chuck of novel and improved construction capable of use for single or double end turning.

Another object of the invention is to provide a chuck of the character described which is easily and quickly actuated and locked in work-clamping position and in which the clamping action increases as the load on the chuck increases.

Another object is to perfect a chuck which is self-equalizing yet which when locked in work-clamping position becomes non-floating without distorting the work piece.

A further object is to provide a chuck having a single means requiring movement through a small arc only for rendering the jaw locking means ineffective and for withdrawing the jaws.

Still a further object is to provide a chuck having jaws and manual means for actuating the same, and locking means for the jaws initially spring actuated and finally manually actuated to complete the locking by relative angular movement of the chuck body and the jaws.

Yet a further object is to provide a chuck having a body, radially movable jaws having cam surfaces on their outer ends, a cam plate for moving the jaws radially, rollers individually spring-pressed between the body and the outer end of the jaws to lock the same in work-clamping position, and means supporting the jaws for angular movement relative to the body to permit wedging of the rollers in locking position.

Other objects and advantages will become apparent from the following description, taken in connection with the accompanying drawing, in which.

Figure 1:
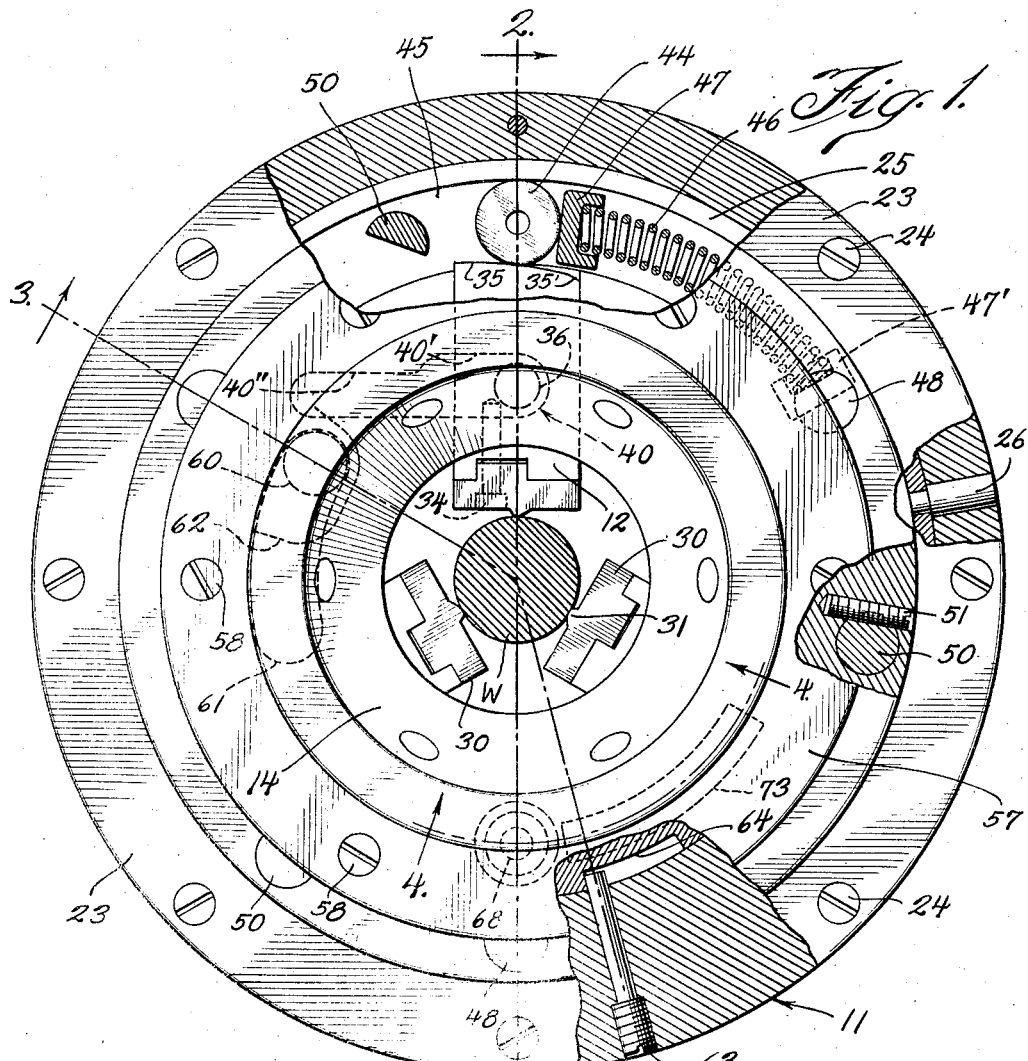
Fig. 1 is an end view partially in elevation and partially in section of a chuck embodying the features of this invention. The chuck is shown with the jaws engaging the work but not locked in work-clamping position.
Figure 4:
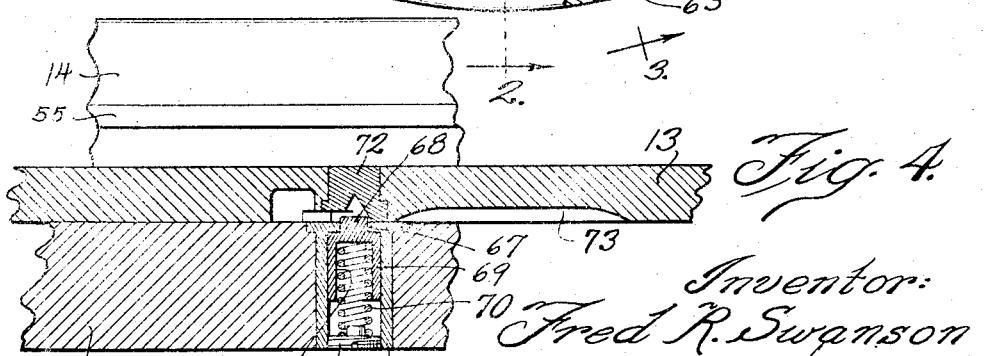
Fig. 4 is a fragmentary detail view taken along line 4—4 of Fig. 1.

While the invention is susceptible of various modifications and alternative constructions, it is here shown and will be described hereinafter in a preferred embodiment, but it is not intended that the invention is thereby to be limited to the specific construction disclosed but it is intended to cover all modifications and alternative constructions falling within the spirit and scope of the invention as defined by the appended claim.

For purposes of disclosure, the chuck is here shown mounted on the end of a hollow flanged spindle 10 and comprises generally a chuck body 11, work-clamping means including jaws 12, and means for actuating and locking the jaws in work-clamping position including a cam plate 13 and an impact member 14. Hereinafter the end of the chuck adjacent the spindle will be referred to as the rear end or face, while the other end will be referred to as the front end or face. The chuck body 11 is annular and is composed of an axially extending flange 15 and a radially inwardly extending flange 16 making the body generally L-shaped in radial cross section. Preferably the radial flange 16 is spaced from the rear face of the chuck body to form an annular shoulder 17 within which is received the flanged end of the spindle 10. Bolts 18 having their heads 19 countersunk in the flange 16 extend through the flange and are threaded into the spindle 10 removably to secure the chuck body to the spindle.

Figures 2, 3:
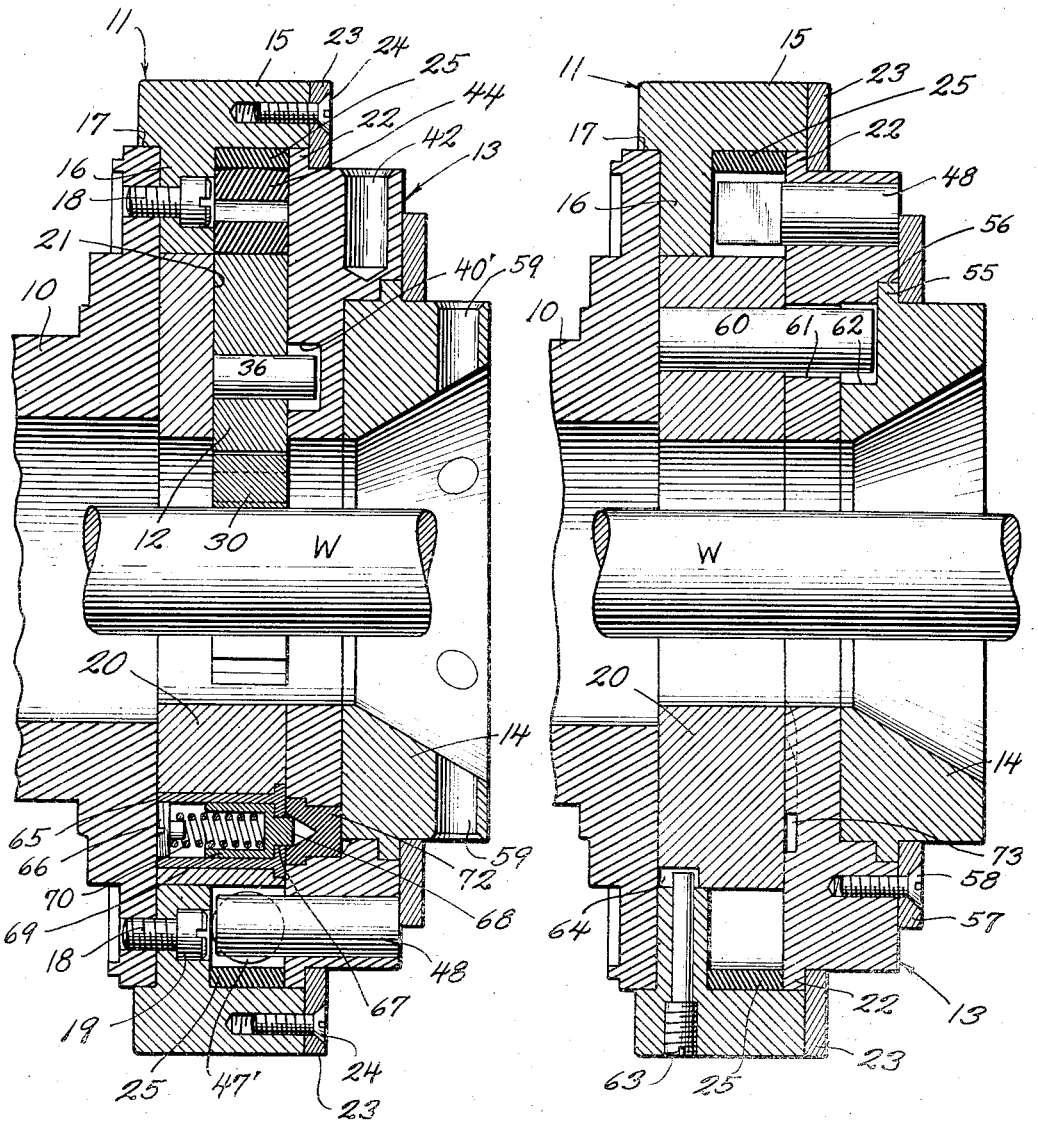
Fig. 2 is an axial section taken along line 2—2 of Fig. 1. Wrench sockets are shown though not actually on the section line.
Fig. 3 is an axial section taken along line 3—3 of Fig. 1.

Mounted within the flange 16 of the chuck body for limited rotation relative thereto is a jaw holder 20 centrally apertured to permit the projection therethrough of a work piece W which is to be secured in the chuck. The jaw holder is substantially thicker than the flange 16 and in the portion extending beyond the forward face of the flange is formed with circumferentially spaced radial channels 21 in which the jaws 12 are reciprocable. The bottoms of the channels 21 are flush with the forward face of the flange 16 (see Fig. 2) to guide the jaws past the flange in their radial outward movement. The jaws 12 are retained in their channels by the cam plate 13 which also serves, among other purposes, to retain the jaw holder against movement in one direction axially of the chuck. To these ends, the came plate 13 is formed with a circumferential flange 22 which is engaged by a retaining ring 23 secured by screws 24 to the flange 15 of the chuck body. An annular spacer 25 fitting within the flange 15 is interposed between the flange 16 and the cam plate to prevent the latter from binding the jaws or the jaw holder. The spacer 25 forms a cylindrical surface concentric with the axis of the chuck and is constrained to rotate with the chuck body by means of a pin 26 extending through the flange 15 and into engagement with the spacer. The jaw holder is restricted against movement in the opposite direction axially of the chuck by the spindle 10.

In the present instance three jaws 12 (see Fig. 1) are provided. These jaws are rectangular in transverse and longitudinal cross section and fit slidably within the channels 21 equally spaced angularly. At its inner end, each jaw 12 is provided with a removable tip 30 of hardened material. These tips are of varying thickness so that by the choice of a tip of proper thickness the chuck may be adapted to clamp work pieces of different diameter. Each tip 30 is provided with a tooth 31 for engaging the work piece and with a segment 32 interfitting with a recess 33 in the jaw to carry the strain and permit the tips to be secured by a single bolt 34.

Figure 5:
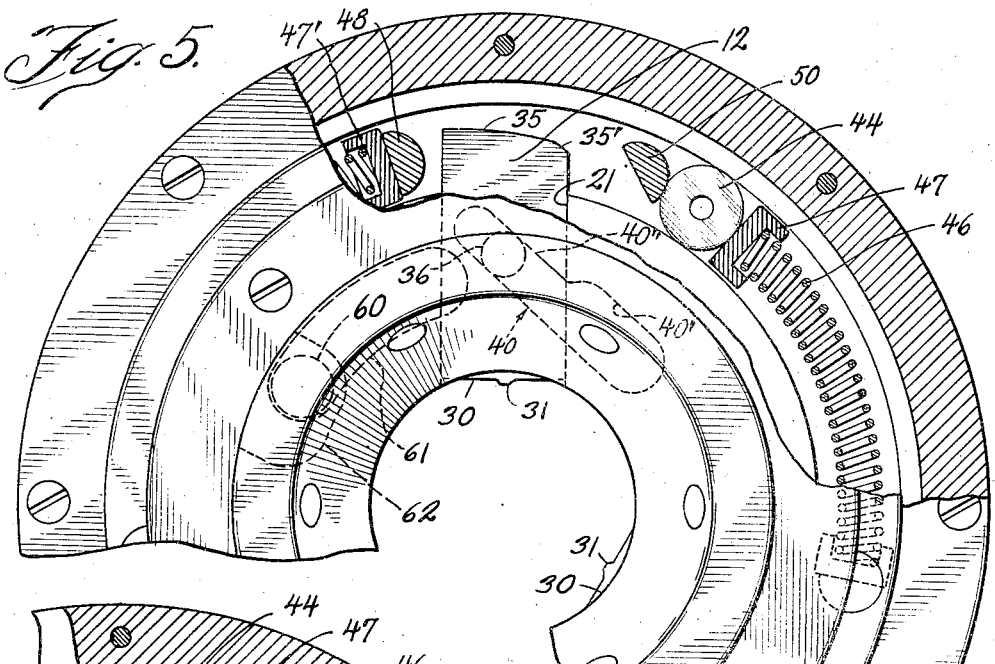
Fig. 5 is a fragmentary view partially in elevation and partially in section showing the chuck with the jaws in fully retracted position.
Figure 6:
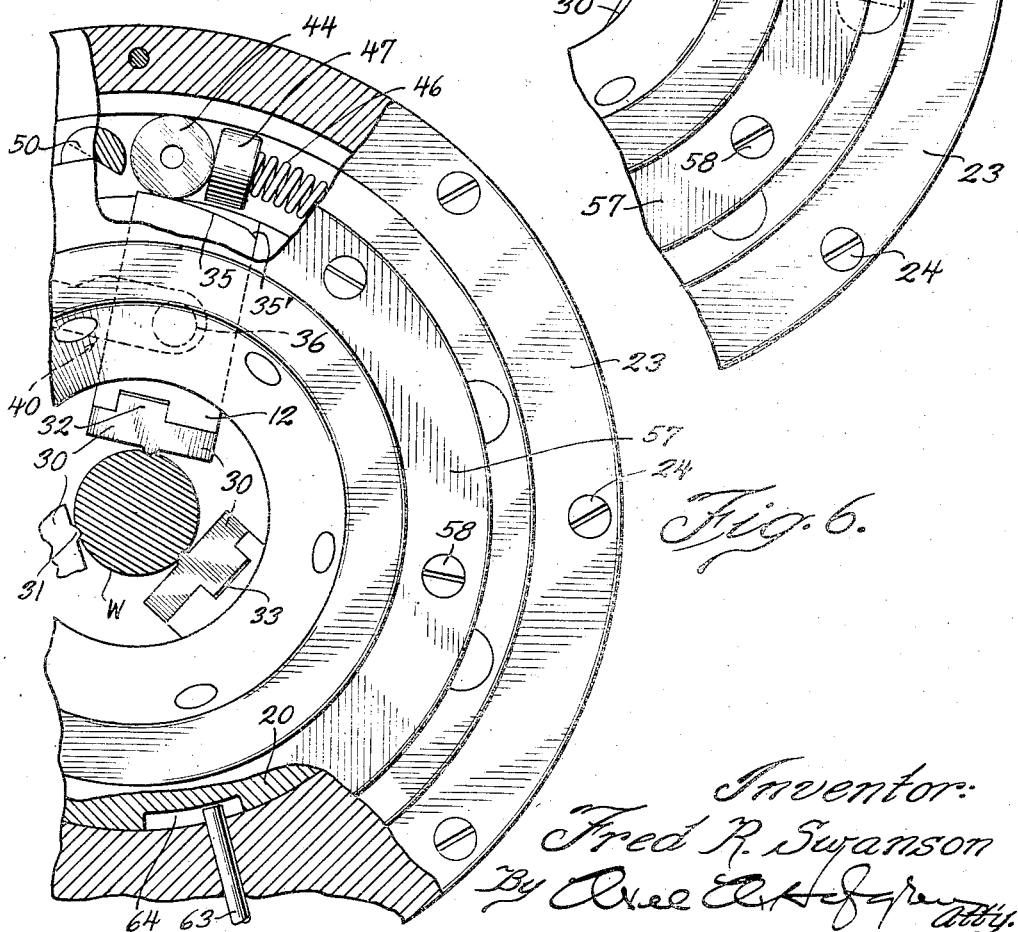
Fig. 6 is a fragmentary view partially in elevation and partially in section showing the jaws locked in work-clamping position.

The outer end of each jaw is formed to provide a cam surface 35 of a character such that the length of the jaw increases progressively when traversed in a counter-clockwise direction, as viewed in Figs. 1, 5 and 6, the chuck being adapted to rotate the work piece in that direction. The length of the jaws is such that when proper tips 30 have been selected and the jaws moved radially inwardly until the teeth 31 on the tips contact the work, the trailing edge of the outer end of each jaw (see Fig. 1) will be inwardly of the periphery of the jaw holder while the leading edge will project beyond the periphery. Preferably the trailing edge is slightly bevelled at 35'. Intermediate its ends each jaw carries a projecting pin 36.

Means is perfected herein for making the chuck self-equalizing yet providing for non-floatingly locking the jaws in equalized position, and for effecting such locking and release of the jaws in a simple, expedient manner. To that end the jaws are reciprocated to and from work-clamping position by a limited rotation of the cam plate 13, which for that purpose is formed with cam slots generally designated 40 into which the jaw pins 36 project. The cam slots 40 extend at right angles to a diameter passing through the center of curvature of the inner end of the slot so that rotation of the cam plate through a small arc in a clockwise direction, as viewed in Figs. 1, 5 and 6, will move the jaws radially from the position shown in Fig. 1 to the fully retracted position shown in Fig. 5. In order that the jaws, when in work-clamping position, may have a limited movement independently of one another and of the cam plate to effect equalization, the inner half 40' of the slot is made slightly wider than the diameter of the jaw pins 36 so as to provide a lost motion connection permitting the independent movement. The remaining portion 40" of the cam slot 40 is substantially equal in width to the diameter of the jaw pins. At its outer circumference the cam plate 13 is made thick enough to accommodate a series of sockets 42 for the reception of a wrench for rotating the cam plate.

Locking the jaws in work-clamping position and providing the driving connection between the chuck body and the jaws are a plurality of wedge means here in the form of rollers 44. One such roller is provided for each of the jaws and operates in the raceway 45 formed by the chuck body, the cam plate 13 and the jaw holder 20. Each roller is yieldably urged between the spacer 25 and the cam end 35 of the jaw by a compression spring 46. At one end, the spring 46 is seated in a socket 47 which bears against the roller 44 while at the other end the spring is seated in a similar socket 47' abutting a pin 48 carried by the cam plate 13 and projecting into the raceway 45 in which the roller operates. As best seen in Fig. 5, half of the pin 48 is cut away to provide a flat surface against which the socket 47' abuts.

A similar pin 50 carried by the cam plate and projecting into the raceway 45 is provided for each of the rollers 44 to limit the movement of the roller under the influence of the spring 46 and particularly to withdraw the roller from between the jaw and the spacer 25 in order to permit outward movement of the jaw. Each pin 50 has one-half thereof cut away to provide a flat surface and is disposed with this surface facing inwardly but rotated in a clockwise direction as viewed in Fig. 1 to a position inclined with respect to a radial line through the pin. This is done in order that the pin 50 may clear the jaw 12 when the cam plate is actuated to withdraw the jaws. Each pin 50 is secured in this position by means of a set screw 51 threaded into the cam plate and partially into the pin.

It will be apparent from the foregoing that by limited clockwise rotation, as viewed in Fig. 1, the cam plate 13 serves both positively to remove the rollers 44 from locking relation with respect to the jaws by direct engagement of the pins 50 with the rollers 44 and to retract the jaws 12. When the cam plate is rotated in a counter-clockwise direction, it functions to move the jaws radially inwardly into contact with the work piece and impositively urges the rollers into locking relation with respect to the jaws by compressing the springs 46. Thus it is seen that due to the lost motion between the slots 40 in the cam plate and the jaw pins 36, the jaws are self-equalizing and will be capable of securely clamping a work piece, should it be slightly eccentric or out of round, without distorting it. Furthermore, it will be apparent that each roller 44 will initially assume a position entirely dependent upon the position of the jaw with which it is associated.

Final locking of the jaws 12 in equalized work-clamping position is effected by rotation of the jaws and jaw holder relative to the chuck body 11. Such relative rotation between the jaws and the chuck body causes the rollers 44 to climb to a higher point of the cam surface 35, forcing the jaws into gripping relation with respect to the work and wedging the rollers securely between the jaws and the chuck body. In the present instance rotation of the jaw holder 20 and the jaws 12 relative to the chuck body is imparted by the impact member 14. This member is provided with an annular flange 55 received in a groove 56 formed in the cam plate 13 and retained in the groove by means of a retaining ring 57 secured to the cam plate by screws 58. About its periphery the impact member 14 is formed with a series of circumferentially spaced sockets 59 for the reception of a wrench. Rotation of the impact member 14 is imparted to the jaw holder 20 by means of a pin 60 carried by the jaw holder and projecting through an arcuate slot 61 in the cam plate 13 into engagement with the impact member 14. In order that the force transmitted from the impact member to the jaw holder 20 may be in the nature of a sharp blow the member 14 is formed with an arcuate recess 62 into which the pin 60 projects and which is several times longer than the diameter of the pin. Thus it will be seen that the impact member 14 has a limited rotation relative to the jaw holder 20 so that by rotating the impact member in a clockwise direction, as viewed in Figs. 1, 5 and 6, the jaw holder 20 may be given a sharp blow thereby imparting to it a clockwise rotation forcing the rollers 44 into tight wedging relation with respect to the jaws 12 and the chuck body.

For unlocking the jaws, the impact member 14 is not necessary because pins 50 on the cam plate directly engage the rollers 44 to loosen them and withdraw them. A pin 63 extends radially through the flange 16 of the chuck body and projects into a short peripheral groove 64 in the jaw holder 20 to limit the relative rotation between the jaw holder and the chuck body.

Disposed axially in the jaw holder 20 is a sleeve 65 closed at one end by a screw plug 66 and at the other end having an opening defined by an inwardly projecting flange 67. Slidable within the sleeve 65 and having a reduced portion 68 adapted to project through the opening defined by the flange 67 is a detent pin 69 urged to projected position by a compression spring 70 seated at one end in a recess 71 formed in the pin and at its other end abutting the screw plug 66. The projecting end 68 of the pin is adapted to engage in a detent socket 72, carried by the cam plate 13, when the plate has been rotated to a position moving the jaws inwardly into engagement with the work piece. The detent serves to maintain the over travel of the cam plate, i. e., hold it in the position shown in Fig. 1 with the pins 50 out of engagement with the rollers 44, until the impact blow of the member 14 has wedged the rollers in jaw-locking position. The detent also prevents the cam plate from oscillating upon sudden reverses or jogging to prevent unlocking of the chuck by the pins 50 striking the rollers 44. Preferably the cam is cut away to form a groove at 73 in which the detent pin rides when the cam plate is swung in a clockwise direction to withdraw the jaws.

The operation of the chuck briefly is as follows: Assuming that the chuck is open, that is that the jaws are in fully retracted position as shown in Fig. 5, a work piece could then be inserted in the chuck. By inserting the customary tool in one of the sockets 42 of the cam plate, the plate would then be rotated in a counter-clockwise direction as viewed in Figs. 1, 5 and 6. In such rotation the slots 40 would engage the pins 36 of the jaws 12 and cam the same radially inwardly into contact with the work piece. The position of the jaws would be determined entirely by the shape of the work piece because of the lost motion between the inner portion 40' of the slots in the cam and the pins 36 so that the chuck would be self-equalizing. Such rotation of the cam plate would also move the pins 50 in a counter-clockwise direction beyond the jaws and would compress the springs 46 and thereby yieldably urge the rollers 44 between the ends of the jaws and the spacer member 25. The jaws and the rollers would then assume the position shown in Fig. 1. For the final locking of the jaws in work-clamping position, the tool is inserted in one of the sockets 59 of the impact member 14 and the member rotated rapidly in a clockwise direction. Such clockwise rotation of the member 14 would impart a sharp blow to the jaw holder 20 and the jaws, thereby rotating the same relative to the chuck body causing the rollers 44 to mount to a higher portion of the cam surface 35 and thereby force the jaws downwardly into gripping relation with respect to the work piece and wedging the rollers securely between the jaws and the chuck body, as shown in Fig. 6. The chuck is now in operative position and it will be seen that when a load is applied tending to resist rotation of the work piece, the drive is through the rollers 44 and that drive is in a direction tending to cause further wedging action thus increasing the gripping action of the chuck.

To unlock the chuck for removing the work piece, it is only necessary to rotate the cam plate 13 in a clockwise direction thereby directly engaging the rollers 44 by the pins 50 to loosen the rollers. Continued rotation of the cam plate then withdraws the rollers and the jaws 12.

Thus it will be seen that I have perfected a chuck which has radially movable jaws independently movable and independently locked so as rigidly to clamp an eccentric work piece without distorting the same, such movement and locking of the jaws, however, being effected by movement of a single element; in which the clamping action increases with the load on the chuck, and which is sturdy and readily manufactured and assembled.

I claim as my invention:

1. A chuck comprising, in combination, a body, a plurality of jaws, a jaw holder rotatable relative to said body, means for moving said jaws radially for clamping or unclamping a work piece, and means interposed between the body and the jaws when in work-clamping position for locking the jaws in clamping position and for transmitting the rotation of the body to the jaws.

2. A chuck comprising, in combination, a body, a plurality of jaws, means for moving said jaws radially for clamping or unclamping a work piece, wedge means interposed between the body and the jaws when in work-clamping position for locking the jaws in clamping position and for transmitting the rotation of the body to the jaws, said wedge means increasing the clamping action of the jaws as the load on the chuck increases.

3. A chuck comprising, in combination, a body, having an internal cylindrical surface concentric with the axis of the chuck, a plurality of jaws having cam surfaces on their outer ends, means for moving said jaws radially into and out of clamping relation to a work piece, and rollers interposed between the cylindrical surface and the cam ends of said jaws wedging said jaws in work-clamping position and transmitting the rotation of said body to the jaws.

4. A chuck comprising, in combination, a body, a plurality of jaws, means for moving said jaws radially into and out of work-clamping relation, said means having a lost motion connection with said jaws permitting limited independent movement of the jaws in either direction radially in work-clamping position, yieldable means urging said jaws to work-clamping position to permit self-equalization thereof, and means for non-floatingly locking said jaws in work-clamping position.

5. A chuck comprising, in combination, a body, a plurality of jaws, means for moving said jaws radially into and out of work clamping relation, said means having a lost motion connection with said jaws, individual jaw-locking and rotation-transmitting means interposed between said jaws and said body, and individual springs urging said last named means into jaw-clamping position.

6. A chuck comprising, in combination, a body, a plurality of jaws, means for moving said jaws radially having a lost motion connection with said jaws to permit self-equalization thereof, rollers adapted to be interposed between said jaws and said body for pressing said jaws into engagement with a work piece and for transmitting rotation of said body to said jaws, and individual springs urging said rollers between said jaws and said body.

7. A chuck comprising, in combination, a body, a plurality of jaws having cam surfaces on their outer ends, means for moving said jaws radially to open or close the chuck having a lost motion connection with said jaws to permit self-equalization thereof, rollers adapted to be interposed between the cam end of said jaws and said body when the chuck is closed for urging said jaws into work-clamping position, individual spring means urging said rollers between said jaws and said body, and means for rotating said jaws relative to said body for wedging said rollers into jaw-locking position.

8. A chuck comprising, in combination, a body, a plurality of jaws, a jaw holder rotatable relative to said body providing radial guides for said jaws, a cam plate rotatable relative to said body and said jaw holder, said plate having a plurality of cam grooves therein, a pin on each of said jaws engaging one of said cam grooves to be moved radially thereby upon rotation of said plate relative to said jaws, a roller interposed between the outer end of each jaw and said body for locking the jaws in work-clamping position and for transmitting the rotation of said body to said jaws, individual springs urging said rollers between the ends of said jaws and said body, and an impact member for rotating said jaws relative to said body to wedge the rollers in locking position.

9. A chuck comprising, in combination, a body, a plurality of jaws radially movable to open or close the chuck, means urged between the ends of said jaws and said body for urging the jaws into clamping relation with respect to a work piece, and a single means for withdrawing said first mentioned means completely from between said jaws and said body and thereafter moving said jaws radially to the chuck-open position.

10. A chuck comprising, in combination, a body, a plurality of jaws radially movable, rollers adapted to be disposed between the ends of said jaws and said body when the chuck is in closed position, and a cam plate having engagement with said jaws for moving the same radially, and carrying means for positively removing said rollers from between said jaws and said body when opening the chuck, and for yieldably urging the rollers between the jaws and the body when closing the chuck.

11. A chuck comprising, in combination, a body, a plurality of jaws radially movable, a pin projecting axially of the chuck from each of said jaws, rollers adapted to be interposed between the ends of said jaws and said body when the chuck is in closed position for forcing the jaws into work-clamping position and for transmitting the rotation of said body to said jaws, a cam plate having cam slots into which said pins project and by which said jaws are moved radially upon rotation of said plate, pins carried by said plate and adapted, upon rotation of said plate to withdraw said jaws, to engage said rollers and withdraw the same from between said jaws and said body, a spring for each of said rollers having one end abutting the same, and a pin carried on said cam plate providing an abutment for the other end of said spring.

12. A chuck comprising, in combination, a body, a jaw holder mounted for limited rotation within said body, a plurality of jaws movable radially in said holder and each jaw having a cam surface on its outer end, a pin projecting from each of said jaws, rollers adapted to be interposed between the ends of said jaws and said body, a cam plate having a plurality of cam slots for receiving the projecting ends of said jaw pins and adapted to move said jaws radially upon rotation of said plate, means carried by said plate adapted upon rotation of the plate in a direction to open the chuck to engage said rollers and positively withdraw the same from between said jaws and said body, and upon rotation in the opposite direction yieldably to urge said rollers between said jaws and said body, an impact member rotatably mounted on said plate having an arcuate recess, said plate having an arcuate slot, and a pin mounted in said jaw holder and projecting through the arcuate slot in said plate into the arcuate recess in said impact member.

13. A chuck comprising, in combination, a body, a plurality of jaws, a jaw holder having limited rotation relative to said body, a cam plate for moving said jaws radially having a lost motion connection therewith, means adapted to be interposed between said jaws and said body for locking the jaws in work-clamping position and for transmitting the rotation of said body to said jaws, and a detent pin and detent socket, one mounted in said cam plate and the other in said jaw carrier and adapted to engage when the chuck is in closed position.

14. A chuck comprising, in combination, a driving body, a plurality of radially movable jaws, a jaw holder mounted within said body for limited rotation relative thereto, and means adapted to be interposed between the body and the jaws when the jaws are in work clamping position for locking the jaws in clamping position and for transmitting the rotation of the body to the jaws, said means being withdrawable from between the body and the jaws.

FRED R. SWANSON.